United States Patent [19]
Simmons et al.

[11] Patent Number: 5,964,252
[45] Date of Patent: Oct. 12, 1999

[54] ADHESIVE CLOSURE SYSTEM WITH AN ABRIDGED RELEASE LINER

[75] Inventors: George R. Simmons, Mentor; Gerald H. Knittel, Brecksville; Judith A. Roth, Akron, all of Ohio

[73] Assignee: Morgan Adhesives Company, Stow, Ohio

[21] Appl. No.: 08/993,587

[22] Filed: Dec. 18, 1997

[51] Int. Cl.⁶ .................................................. F16L 57/00
[52] U.S. Cl. .................. 138/149; 138/156; 138/DIG. 1; 138/128; 138/151; 428/40.1
[58] Field of Search .................... 138/149, 156, 138/141, 151, 128, 110, DIG. 1; 428/40.1, 41.8

[56] References Cited

U.S. PATENT DOCUMENTS

| | | | |
|---|---|---|---|
| 2,800,215 | 7/1957 | Converse | 428/354 X |
| 2,860,081 | 11/1958 | Eiken | 428/354 X |
| 3,334,805 | 8/1967 | Halbach | 383/70 |
| 3,504,475 | 4/1970 | Dickard et al. | 53/410 |
| 3,900,642 | 8/1975 | Michel | 428/40.1 |
| 3,921,847 | 11/1975 | Rentmeester | 138/170 X |
| 4,022,248 | 5/1977 | Hepner et al. | 138/170 X |
| 4,157,410 | 6/1979 | McClintock | 428/41.8 |
| 4,182,789 | 1/1980 | Castelluzzo | 428/40.1 |
| 4,197,880 | 4/1980 | Cordia | 138/99 |
| 4,584,201 | 4/1986 | Boston | 426/106 |
| 4,584,217 | 4/1986 | McClintock | 428/41.8 |
| 4,606,957 | 8/1986 | Cohen | 138/149 X |
| 4,702,788 | 10/1987 | Okui | 428/41.8 X |
| 4,857,371 | 8/1989 | McClintock | 138/149 X |
| 4,987,019 | 1/1991 | Jones | 428/40.1 X |
| 4,996,088 | 2/1991 | Knittel et al. | 138/149 X |
| 5,040,903 | 8/1991 | Schramer | 383/70 |
| 5,044,776 | 9/1991 | Schramer et al. | 383/89 |
| 5,104,701 | 4/1992 | Cohen et al. | 138/149 X |
| 5,130,185 | 7/1992 | Ness | 428/40.1 |
| 5,421,371 | 6/1995 | Lauer | 138/149 X |
| 5,458,938 | 10/1995 | Nygard et al. | 428/40.1 |

*Primary Examiner*—Patrick Brinson
*Attorney, Agent, or Firm*—Oldham and Oldham Co., L.P.A.

[57] ABSTRACT

The present invention relates to an adhesive closure system. More specifically, this invention relates to an adhesive closure system with an abridged release liner. Initially, the abridged release liner allows partial exposure of the single adhesive layer to achieve a temporary bond. When desired, the release liner can be removed exposing the remainder of the adhesive to achieve a permanent bond. This type of closure system has numerous applications including the closure system for pipe insulation sleeves.

26 Claims, 3 Drawing Sheets

ADHESIVE CLOSURE SYSTEM WITH AN ABRIDGED RELEASE LINER

TECHNICAL FIELD

The present invention relates to an adhesive closure system. More specifically this invention relates to an improved adhesive closure system with an abridged release liner for closing the slit in pipe insulation sleeves.

BACKGROUND OF THE INVENTION

Many adhesives are regularly used to facilitate temporarily or permanently bonding like and unlike elements. Types of adhesives commonly used include reactive, anaerobic, pressure sensitive and thermosetting. All have limitations which dictate their preferred usage.

As used herein, the term "pressure sensitive adhesive" refers to an adhesive that is tacky at ambient or room temperatures. Pressure sensitive adhesives are often used as the adhesive means in various closure systems. The pressure sensitive adhesive on a closure system must be covered with a release liner during shipping or a storage to prevent a premature permanent bond from occurring. The release liner completely isolates the intended exposed area of the adhesive. This complete isolation of the adhesive is not always desirable.

A particular application of this type of temporary to permanent adhesive closure system is in the area of pipe insulation sleeves. Pipes which are used in dwellings and commercial buildings are often covered with an insulation sleeve or wrap. The insulation sleeves are typically installed for improved energy efficiency or safety. The pipes may be made of copper, plastic, cast iron, or other like materials. The insulation sleeve or wrap is generally a cylindrically shaped tubular section having a centrally disposed channel along its longitudinal axis to receive the pipe. The insulation sleeve may be constructed of a flexible elastomeric foam such as vinyl nitrile, or various other insulating materials such as a glass fiber layer with a protective overcoating. Each section has a slit that extends radially from the inside diameter of the tube to its outer surface, and longitudinally along the entire length of the sleeve. This slit, herein referred to as the access slit, affords an opening, or access for the pipe to enter the sleeve so as to reside within the central channel. Normally the insulation sleeve will come in 6 to 8 foot lengths with internal diameters ranging from 1 to 8 inches and external diameters ranging from 2 to 10 inches. Typically the tubular insulation is cut to length and installed around the pipe by means of the longitudinal access slit. Once the sleeve is in place, the opposite walls of the access slit are brought together and sealed. Typically, sealing is accomplished through the use of a pressure sensitive adhesive applied to one or both of the opposite faces of the access slit. An alternate method of closure comprises a longitudinally extending flap, herein referred to as a closure flap, on the outer surface of one side of the access slit, the closure flap incorporates a pressure sensitive adhesive on the inner side of the flap. The flap is pressed into engagement with the outer surface of the other side of the access slit, thereby forming the adhesive bond.

Adhesive is typically applied during manufacture of the insulation sleeve and a solid release liner is applied to the adhesive. It is known to use a solid release liner that completely covers and isolates the exposed side of the adhesive to allow the insulation sleeve to be shipped and installed before a permanent bond is achieved. Alternately, the adhesive can be applied during the installation of the insulation sleeve, by the installer. Both of these methods require the insulation sleeve to be shipped with the access slit in an unbonded or open position. An insulation sleeve shipped with the access slit in this open position, is less rigid than if the access slit were bonded in the closed position. Because the open or unbonded insulation sleeve is less rigid than a closed or unified sleeve, the open sleeve may permanently deform from its own weight and the weight of the sleeves stored above it. This deformation causes numerous problems including sleeves that do not fit in the intended pipe, and internal stresses that occur when the deformed sleeve is placed on the pipe, causing the adhesive joint to prematurely fail.

SUMMARY OF THE INVENTION

The present invention discloses an improved adhesive closure system. A preferred embodiment of the invention discloses an improved adhesive closure system for pipe insulating sleeves which employs an area or elongated strip or segment of a single layer of pressure sensitive adhesive with an abridged release liner partially covering the adhesive surface. "Abridged" as used herein means a release liner which is shortened in length or width, or otherwise abbreviated by cutting away sections thereof, or by perforating or boring holes therethrough.

The preferred embodiment employs a release liner that is abridged by means of perforations or holes disposed therein. The single layer of pressure sensitive adhesive and the perforated release liner extend the length of the insulating sleeve, along its longitudinal axis. One side of the pressure sensitive adhesive strip is affixed to the inner surface of a longitudinally extending closure flap. The perforated release liner is removable affixed to the exposed side of the pressure sensitive adhesive on the inner side of the closure flap. This closure flap may be integral with, or affixed to, the outer surface of the pipe insulation sleeve, adjacent and longitudinally parallel to the access slit. The amount of percentage of pressure sensitive adhesive exposed by the bridged release liner through apertures or perforations is sufficient to form a first or temporary bond when the closure flap is pressed into engagement with the outer surface of the pipe insulation sleeve on the opposite side of the access slit.

The inventors have identified several instances where an initial temporary bond may be desired during shipping or storage, followed by a permanent bond upon final disposition of the closure system.

Temporary bond as used herein defines a level of adhesion sufficient to releasably affix the intended elements. The amount of adhesive exposed to form the temporary bond may be any predetermined percentage necessary for the particular application. The initial bond must have the strength to temporarily adhere the surfaces together, but when desired, have the ability to be separated so as to enable the removal of the release liner, thereby exposing the adhesive surface in its entirety, in order that a second, permanent bond can be achieved.

Permanent bond as used herein defines a level of adhesion at least equal to the temporary bond and sufficient to affix the intended elements in final placement. The first, temporary bond unitizes the insulation sleeve, thereby strengthening the sleeve so as to reduce damage and deformation during shipping. When the insulation sleeve is to be installed on a pipe, the closure flap can be pulled away from the outer surface of the opposite side of the access slit, thereby severing the temporary adhesive bond, thus enabling the insulation sleeve to be installed around a pipe by means of the access slit. Once the insulation sleeve is in place around the pipe, the perforated release liner is pulled away from the pressure sensitive adhesive strip, thereby exposing the remainder of the adhesive surface. The area of exposed adhesive is then sufficient to achieve a second, permanent bond when the closure flap is pressed into engagement with the outer surface of the insulation sleeve on the opposite side of the access slit.

Numerous other applications could benefit from a first, temporary closure, then when desired a second, permanent closure, using only a single layer of a single adhesive. These include but are not limited to large document envelopes that are often handled, transported and the contents added to or viewed by numerous people in an office environment prior to final mailing. It would be desirable to have a temporary closure system to secure the contents of the envelopes prior to mailing, and upon removal of the abridged release liner, have a permanent adhesive closure suitable for mailing.

Another application could involve bags or boxes that are being filled with parts on an assembly line. A temporary closure to secure the contents between stations on an assembly line, then upon removal of the release liner permanently close the bag or box for shipping.

Therefore, it is an object of the present invention provide an adhesive closure system with an abridged release liner.

It is also an object of the present invention to provide an adhesive closure system with an abridged release liner that exposes a first area of adhesive to form a temporary bond.

It is also an object of the present invention to provide an adhesive closure system with an abridged release liner to form a second, permanent bond upon complete removal of the release liner.

It is a further object of the present invention to provide an adhesive closure system with an abridged release liner for pipe insulating sleeves.

It is a further object of the present invention to provide an adhesive closure system with an abridged release liner for pipe insulating sleeves that an form a temporary bond for shipping or storage, and upon removal of the release liner, can form a permanent bond for installation of the sleeve around the desired pipe.

It is an object of the present invention to provide an adhesive closure system with an abridged release liner for pipe insulating sleeves that can form a temporary bond and a permanent bond using a single layer of a single adhesive.

It is also an object of the present invention to provide an adhesive closure system with an abridged release liner that can be installed on the pipe insulation sleeve during its manufacture.

These and other objects and advantages of the present invention will become more readily apparent from a reading of the detailed description of the preferred embodiment taken in conjunction with the drawings and the claims.

DETAILED DESCRIPTION OF THE PREFERRED EMBODIMENT

Figure 1:
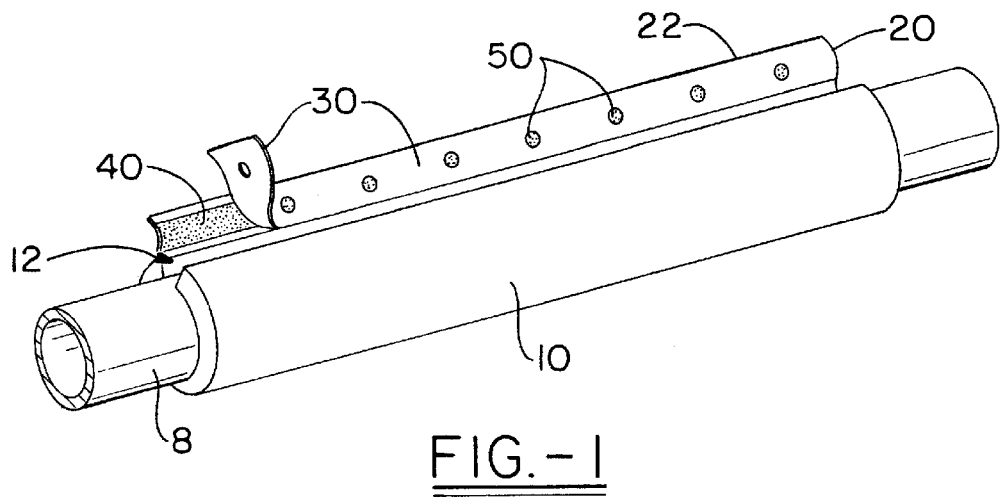
FIG. 1 is a perspective view of a pipe covered with an insulation sleeve that incorporates the present invention as the closure system.

This invention will be described in detail with reference to the preferred embodiment thereof. Elements are identified with reference numerals throughout the drawings and the specification.

Now with reference to the drawings, FIG. 1 illustrates a first preferred embodiment of the present invention used as the closure system for a pipe insulation sleeve. Insulation sleeve 10, known in prior art to be a longitudinally extending cylindrical tube, with a radial access slit 12, which extends from the inner surface of the sleeve to the outer surface, and longitudinally along the entire length of the sleeve. Sleeve 10 may be constructed of a flexible foam elastomeric such as vinyl nitrile or various other insulating materials known in the art such as a glass fiber layer wrapped in a protective coating. Access slit 12, allows insulation sleeve 10, to be installed around pipe 8. Closure flap 20, is integral with or affixed to the outer surface of insulation sleeve 10, adjacent and longitudinally parallel to access slit 12. The preferred adhesive system of the present invention is installed on closure flap 20, of pipe insulation sleeve 10. The present invention comprises a single layer or strip of pressure sensitive adhesive 40, one side of which is affixed to the inner surface of closure flap 20. The adhesive layer or strip can be applied as a liquid or a film during the manufacture of the insulating sleeve and closure flap.

In the preferred embodiment, adhesive layer 40, extends substantially the entire length of closure flap 20, along its longitudinal axis. The exposed side of adhesive layer 40, is covered by a release liner 30. Release liner 30 is a strip or segment of paper or paper laminate coated with a non-stick film such as silicone, or a polymer strip or segment with non-stick properties or similarly coated, which is removably attached to adhesive layer 40, in a manner well understood by one skilled in the art. Release liner 30, has perforations 50, spaced at intervals along its length. As used herein, the term "perforation" means a hole, slit, cut out section or aperture with a closed perimeter or with a perimeter that intersects the perimeter of the material in which the perforation is made. The preferred embodiment incorporates a release liner 30, that preferably has the same perimeter shape as the adhesive layer, and its perimeter length is equal to or greater than the perimeter length of the adhesive. The later would afford a pull tab for ease of removal. The adhesive is completely covered by the release liner except for areas exposed by perforations 50. In this preferred embodiment, the percentage of initially exposed adhesive should be in the range of 0%<>50%, but preferably in the range of 5%<>35%. An alternate embodiment employs the size, shape and contour of the perimeter of release liner 30 to expose the desired percentage of adhesive layer 40. Perforations 50, allow a predetermined amount or percentage of adhesive layer 40, to be exposed there through. The apertures or holes of perforations 50, are shown circular in shape, but may be any other conic section or portion thereof or polygonal and of a size that will allow the desired percentage of adhesive layer 40, to be exposed. Perforations 50, may be one or more in quantity, and be spaced at any interval and located at any position along release liner 30, without departing from the spirit of the invention.

Figure 2:
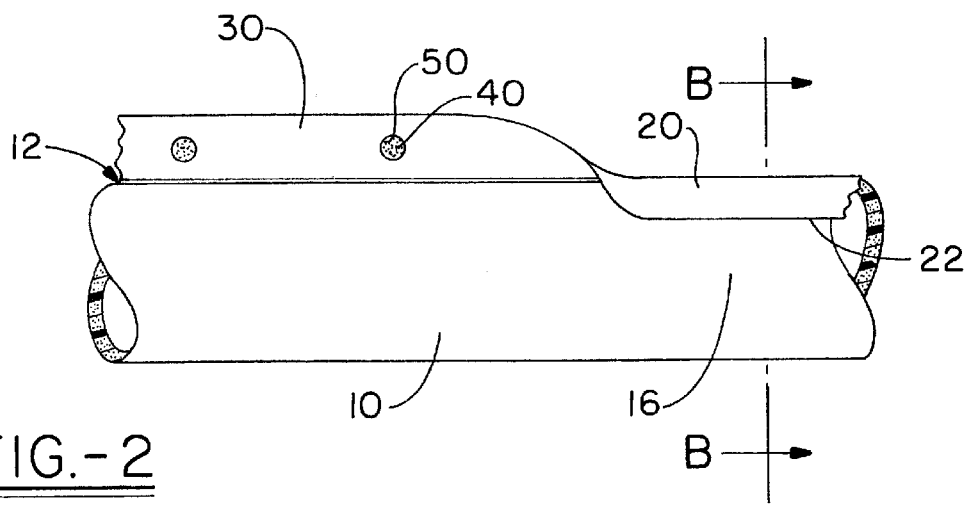
FIG. 2 is a front elevational view showing a partial segment of a pipe insulation sleeve that incorporates a preferred embodiment of the present invention as the closure system.

Referencing now to FIG. 2, the pipe insulating sleeve 10, employs the preferred embodiment of the present invention on closure flap 20. With release liner 30, removable attached to pressure sensitive adhesive layer 40, the free edge 22, of closure flap 20, has been folded across access slit 12, and the inner surface of closure flap 20, has been pressed into engagement with, and is temporarily bonded to the outer surface of insulating sleeve 10, adjacent to slit 12, at end 16. This temporary bond is achieved by a portion of pressure sensitive adhesive layer 40, which is exposed through release liner 30, by means of the void or hole created in release liner 30, by perforation 50.

Figure 4:
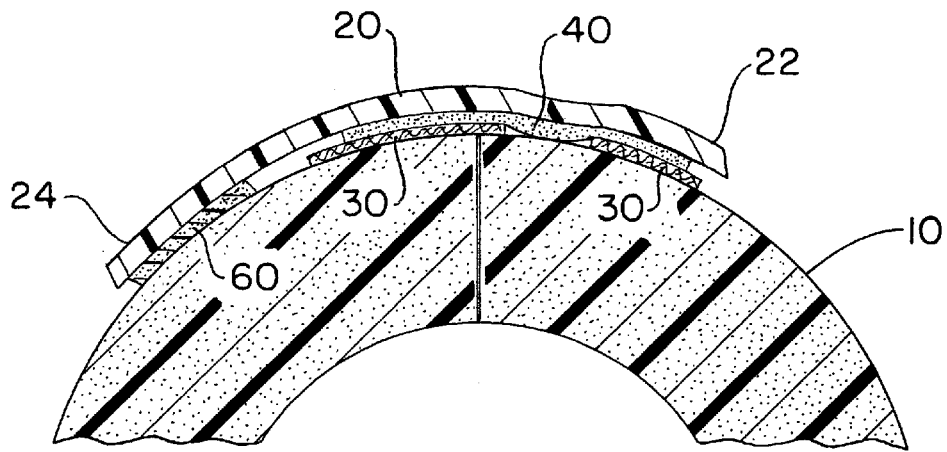
FIG. 4 is an enlarged fragmentary cross sectional view along section line B—B of FIG. 2, showing a cross section of a preferred embodiment of the present invention in place on the closure flap of a pipe insulating sleeve utilizing a first or temporary bond.

FIG. 4 shows an enlarged fragmentary cross sectional view of the temporary bond created in FIG. 2, at end 16, of sleeve 10, across section line B—B. Free edge 22 of closure flap 20 is temporarily bonded to insulating sleeve 10 by means of an area of pressure sensitive adhesive layer 40, being exposed through the perforations in release liner 30. A temporary bond as described would be employed during shipping and storage of the pipe insulation sleeve, prior to installation on as pipe. FIG. 4 also shows edge 24, of non-integral closure flap 20, affixed to insulating sleeve 10. Joint 60, is created during the manufacture of sleeve 10, and is used to locate sleeve closure flap 20 on sleeve 10. Joint 60 may be an adhesive, a thermal bond or any other essentially permanent method of attachment known in the art, and is intended to permanently anchor the closure system in correct orientation relative to slit 12.

Figure 3:
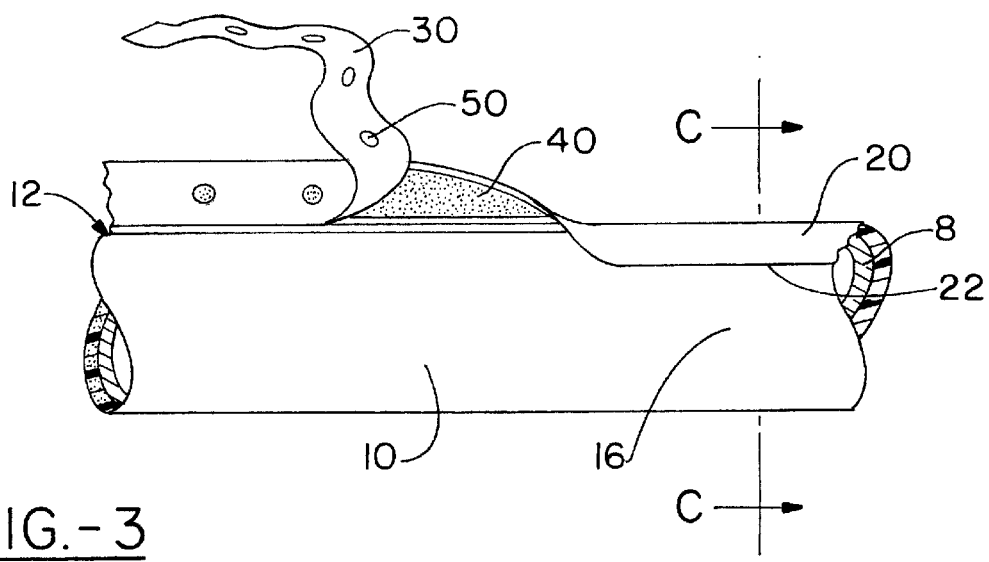
FIG. 3 is a front elevational view showing a partial segment of a pipe, covered with a partial segment of pipe insulation sleeve that incorporates the preferred embodiment of the present invention as the closure system.

Referencing now FIG. 3, the pipe insulation sleeve 10 is installed around pipe 8, by means of access slit 12. To achieve a permanent bond, release liner 30, has been removed from pressure sensitive adhesive layer 40, on the inside surface of closure flap 20, at end 16, of sleeve 10. Free edge 22 of closure flap 20, is folded over access slit 12, and the full surface area of pressure sensitive adhesive 40, is engaged with the outer surface of sleeve 10 adjacent to access slit 12. By engaging the full exposed surface area of pressure sensitive adhesive layer 40, a permanent bond is achieved.

Figure 5:
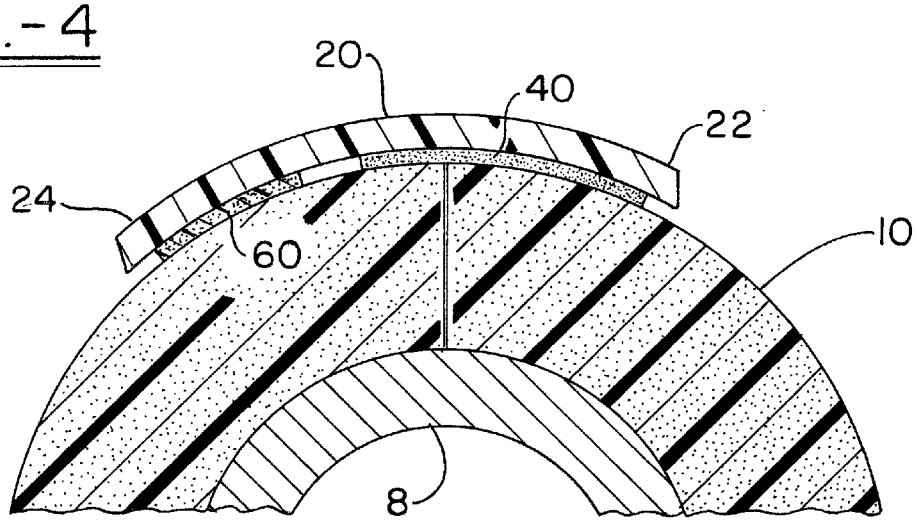
FIG. 5 is an enlarged fragmentary cross sectional view along section line C—C of FIG. 3, showing a cross section of a preferred embodiment of the present invention in place on the closure flap of a pipe insulating sleeve, which is installed on a pipe, illustrating the second or permanent bond.

FIG. 5 shows an enlarged fragmentary cross sectional view of the permanent bond created in FIG. 3, at end 16, of sleeve 10, across section line C—C. Pressure sensitive adhesive layer 40 is in full contact with closure flap 20 and sleeve 10, thereby creating a permanent bond between them. A permanent bond as described would be employed when the pipe insulation sleeve is in a final position, installed around a pipe. FIG. 5 also shows edge 24 of closure flap 20, affixed to insulation sleeve 10. Bond 60 may be an adhesive, a thermal bond or any other permanent bond known in the art.

Figure 6:
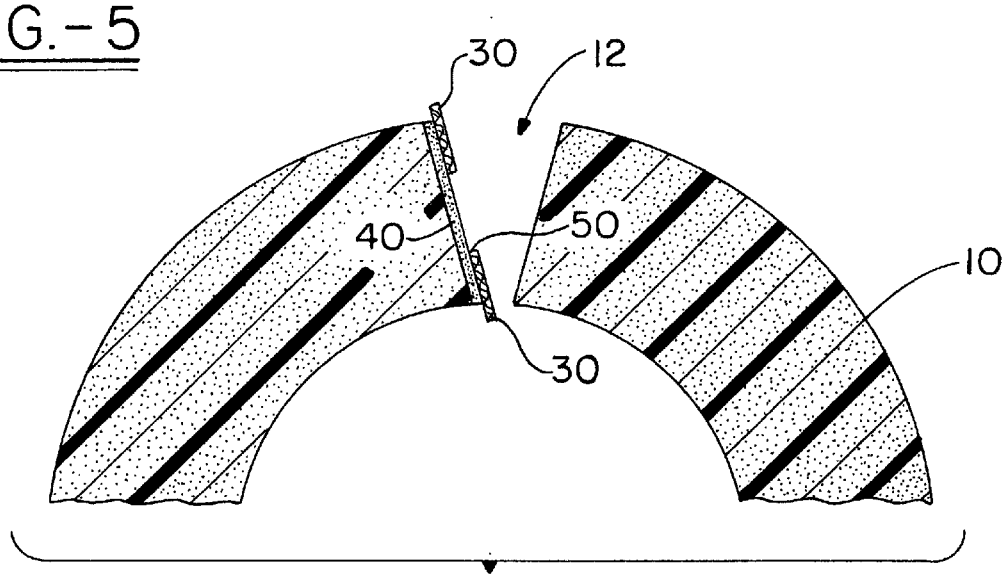
FIG. 6 is an enlarged fragmentary cross sectional view of the present invention in place on a pipe insulation sleeve according to a second embodiment.

FIG. 6 discloses another embodiment wherein one side of the adhesive layer 40, is affixed to one of the opposed terminal edges of the longitudinal extending radial access slit 12, of insulation sleeve 10. Perforated release liner 30 is removably affixed to the exposed side of adhesive layer 40. A percentage of adhesive layer 40, is exposed through release liner 30, through the apertures or holes of perforations 50. When the opposite faces of access slit 12 are brought together in sealing arrangement, an adhesive bond if formed. The bond may be temporary is release liner 30 is included in the engagement, or a permanent bond may be achieved if release liner 30 is removed.

Figure 7:
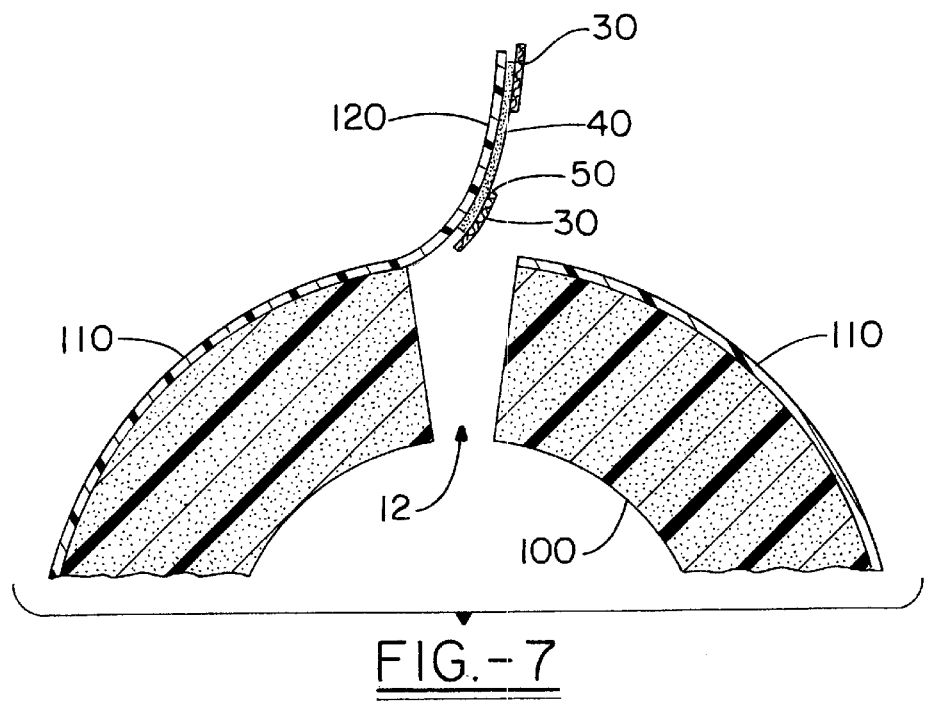
FIG. 7 is an enlarged fragmentary cross sectional view of the present invention in place on a pipe insulation sleeve according to a third embodiment.

FIG. 7 discloses still another embodiment wherein pipe insulation sleeve 100 is constructed of a glass fiber or other material known in the art to have acceptable physical properties to serve as an insulation. A protective covering 110, such as a reflective foil or kraft paper is engaged with and covers the exterior surface of insulation sleeve 100. A closure flap 120, integral with the protective covering 110, extends from the insulation sleeve 100, adjacent to access slit 12. One side of adhesive layer 40, is affixed to the inner surface of closure flap 120. Perforated release liner 30 is removably affixed to the exposed side of pressure sensitive adhesive 40. A percentage of adhesive layer 40, is exposed through release liner 30, through the apertures or holes of perforations 50. When closure flap 120, is folded across access slit 12, and pressed into sealing engagement with protective cover 110, and adhesive bond if formed. The bond may be temporary if release liner 30 is included in the engagement, or a permanent bond may be achieved if release liner 30 is removed.

Figure 8:
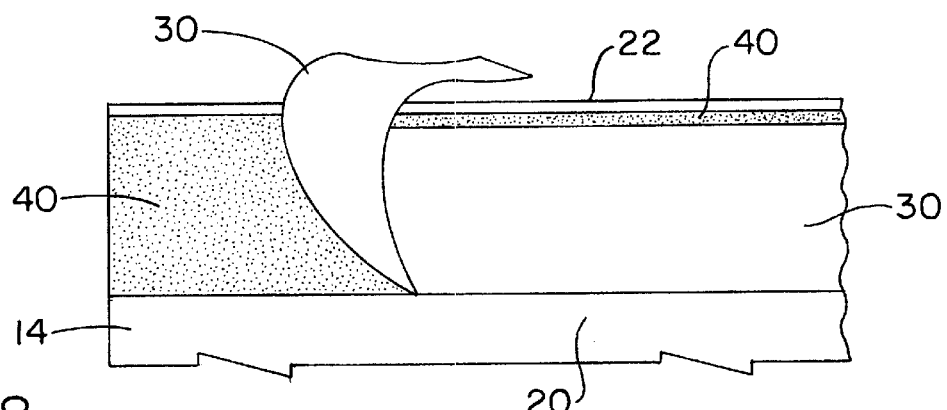
FIG. 8 is a fragmentary view of an alternate embodiment of the present invention in place on the closure flap of a pipe insulation sleeve.

FIG. 8 discloses still another embodiment of the present invention. One side of adhesive layer 40, is affixed to closure flap 20. Abridged release liner 30, is removably affixed to the other side of adhesive layer 40. The size, shape and placement of abridged release liner 30, in relation to the size and shape of adhesive layer 40, allow a percentage of adhesive layer 40, to be exposed near edge 22, of closure flap 20. The percentage of adhesive exposed when abridged release liner 30, is removably affixed to adhesive layer 40, is sufficient to achieve a temporary bond between closure flap 20 and the pipe insulating sleeve on which it is affixed. A portion of abridged release liner 30, has been peeled away from adhesive layer 40, at end 14, or closure flap 20. The amount of adhesive layer 40, exposed when abridged release liner 30 is removed is sufficient to achieve a permanent bond.

Figure 9:
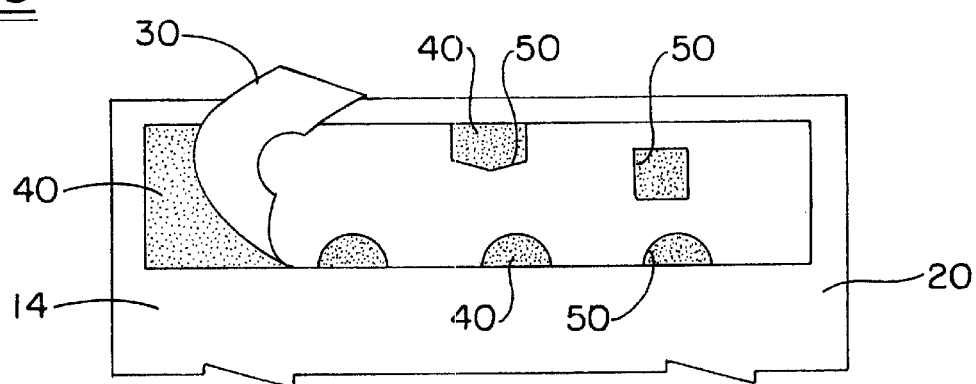
FIG. 9 is a fragmentary view of an alternate embodiment of the present invention in place on the closure flap of a box, bag or envelope, showing some of the many possible shapes, sizes and locations of perforations in the release liner.

FIG. 9 discloses still another embodiment of the present invention that could be used as the closure flap for numerous applications including a bag, box, or envelope. One side of adhesive layer 40, is affixed to closure flap 20. Abridged release liner 30, is removably affixed to the other side of adhesive layer 40. A percentage of adhesive layer 40, is exposed through release liner 30, through the apertures or holes of perforations 50. Perforations 50 are shown in some of the many possible locations and shapes in which they may occur. The percentage of adhesive exposed when abridged release liner 30, is removably affixed to adhesive layer 40, is sufficient to achieve a temporary bond between closure flap 20 and the surface on which it is to be affixed. A portion of abridged release liner 30, has been peeled away from adhesive layer 40, at end 14, of closure flap 20. The amount of adhesive layer 40, exposed when abridged release liner 30 is removed is sufficient to achieve a permanent bond.

The preferred embodiment of the present invention has been described. It is to be understood that the invention is not limited thereto.

What is claimed is:

1. A pipe insulation sleeve assembly which comprises:
   (a) an elongated, hollow, cylindrically shaped tubular section of insulating material having a longitudinally extending access slit between an inner surface and an outer surface of said sleeve, said access slit defining a first side and a second side of said outer surface adjacent said access slit;
   (b) a closure system for maintaining said access slit in a closed position, said closure system comprising an adhesive carrier integrally secured to a first side of said outer surface, extending between said first and second sides of said outer surface and across said access slit, a layer of adhesive disposed on at least a portion of said carrier and capable of contacting said outer surface second side;
   (c) a release liner removably disposed on a first area of said adhesive layer, while a second area of said adhesive layer remains exposed; such that said exposed second area of adhesive layer affords an initial bond between said carrier and said outer surface second side of said access slit;

said first and second areas of exposed adhesive layer combine to afford a second bond between said carrier and said outer surface second side of said access slit when said release liner is removed.

2. A pipe insulation sleeve assembly as specified in claim 1, wherein said release liner contains as plurality of perforations that exposes said second area of said adhesive layer.

3. A pipe insulation sleeve assembly as specified in claim 1, wherein said release liner has a perimeter length that exposes said second area of said adhesive layer.

4. A pipe insulation sleeve assembly as specified in claim 1, wherein said release liner has a perimeter shape that exposes said second area of said adhesive layer.

5. A pipe insulation sleeve assembly as specified in claim 1, further comprising a pressure sensitive adhesive as said adhesive layer.

6. A pipe insulation sleeve assembly as specified in claim 1, wherein said second area of said adhesive layer is a sufficient percentage of said adhesive layer to form a temporary bond.

7. A pipe insulation sleeve assembly as according to claim 1, wherein said second area of said adhesive layer is a percentage within the range of 0%<>50%.

8. A pipe insulation sleeve assembly as according to claim 1, wherein said second area of said adhesive layer is a percentage within the range of 5%<>35%.

9. A pipe insulation sleeve assembly as according to claim 1, wherein said release liner can be removed to expose said entire adhesive layer.

10. A pipe insulation sleeve assembly as according to claim 1 wherein the combination of said first area and said second area of said adhesive layer is sufficient to form a permanent bond.

11. A pipe insulation sleeve assembly as specified in claim 1, wherein said carrier including a protective overcoating on said outer surface of said sleeve and a flap on said outer surface adjacent to and extending beyond said access slit, along the longitudinal length thereof, wherein said adhesive layer and said release line are disposed on said flap.

12. A pipe insulation assembly according to claim 1 wherein said initial bond is a temporary bond.

13. A pipe insulation assembly according to claim 1 wherein said second bond is a permanent bond.

14. A pipe insulation sleeve assembly which comprises:
   (a) an elongated, hollow, cylindrically shaped tubular section of insulating material having a longitudinally extending access slit between an inner surface and an outer surface of said sleeve, said access slit defining a first and a second side wall;
   (b) a closure system comprising a layer of adhesive disposed on at least a portion of at least one side wall and having an exposed surface;
   (c) a release liner removably disposed on a first area of said exposed surface of said adhesive layer, while a second area of said adhesive layer remains exposed; such that said exposed second area of adhesive layer affords a first bond between said first and second side walls of said access slit;

said first and second areas of exposed adhesive layer combine to afford a second bond between said first and second side walls when said release liner is removed.

15. A pipe insulation assembly according to claim 14 wherein said initial bond is a temporary bond.

16. A pipe insulation assembly according to claim 14 wherein said second bond is a permanent bond.

17. A pipe insulation sleeve assembly as specified in claim 14, wherein said release liner contains a plurality of perforations that exposes said second area of said adhesive layer.

18. A pipe insulation sleeve assembly as specified in claim 14, wherein said release liner has a perimeter length that exposes said second area of said adhesive layer.

19. A pipe insulation sleeve assembly as specified in claim 14, wherein said release liner has a perimeter length that exposes said second area of said adhesive layer.

20. A pipe insulation sleeve assembly as specified in claim 14, further comprising a pressure sensitive adhesive as said adhesive layer.

21. A pipe insulation sleeve assembly as specified in claim 14, wherein said second area of said adhesive layer is a sufficient percentage of said adhesive layer to form a temporary bond.

22. A pipe insulation sleeve assembly as according to claim 14, wherein said second area of said adhesive layer is a percentage within the range of 0%<>50%.

23. A pipe insulation sleeve assembly as according to claim 14, wherein said second area of said adhesive layer is a percentage within the range of 5%<>35%.

24. A pipe insulation sleeve assembly according to claim 14, wherein said release liner can be removed to expose said entire adhesive layer.

25. A method for closing a pipe insulation sleeve, said insulation sleeve having an elongated, hollow, cylindrically shaped tubular section of insulating material having a longitudinally extending access slit between an inner surface and an outer surface of said sleeve, said access slit defining a first side and a second side of said outer surface adjacent said access slit; a closure system for maintaining said access slit in a closed position, said closure system comprising an adhesive carrier integrally secured to a first side of said outer surface, extending between said first and second sides of said outer surface and across said access slit, a layer of adhesive disposed on at least a portion of said carrier and capable of contacting said outer surface second side; a release liner removably disposed on a first area of said adhesive layer, while a second area of said adhesive layer remains exposed; comprising the steps of:
   (a) forming an initial closure of said access slit by pressing into sealing engagement said second area of said adhesive layer onto said second side outer surface;
   (b) severing said initial closure;

(c) removing said release liner to expose said first area of said adhesive layer;

(d) forming a second closure of said access slit by pressing into sealing engagement said first area and said second areas of said adhesive layer onto said second side outer surface.

26. A method for closing a pipe insulation sleeve, said insulation sleeve having an elongated, hollow, cylindrically shaped tubular section of insulating material having a longitudinally extending access slit between an inner surface and an outer surface of said sleeve, said access slit defining a first and a second side wall; a closure system comprising a layer of adhesive disposed on an at least a portion of at least one side wall and having an exposed surface; a release liner removably disposed on a first area of said exposed surface of said adhesive layer, while a second area of said adhesive layer remains exposed;

(a) forming an initial closure of said access slit by pressing into sealing engagement said second area of said adhesive layer onto said second side outer surface;

(b) severing said initial closure;

(c) removing said release liner to expose said first area of said adhesive layer;

(d) forming a second closure of said access slit by pressing into sealing engagement said first area and said second areas of said adhesive layer onto said second side outer surface.

* * * * *